United States Patent
Krueger et al.

(10) Patent No.: US 11,199,689 B2
(45) Date of Patent: Dec. 14, 2021

(54) METHOD FOR MICROSCOPIC ANALYSIS (71) Applicant: OLYMPUS SOFT IMAGING SOLUTIONS GmbH, Münster (DE)

(72) Inventors: Daniel Krueger, Berlin (DE); Mike Woerdemann, Ostbevern (DE); Stefan Diepenbrock, Münster (DE)

(73) Assignee: Olympus Soft Imaging Solutions GmbH, Münster (DE)

( * ) Notice: Subject to any disclaimer, the term of this patent is extended or adjusted under 35 U.S.C. 154(b) by 233 days.

(21) Appl. No.: 16/516,806

(22) Filed: Jul. 19, 2019

(65) Prior Publication Data
US 2020/0026057 A1    Jan. 23, 2020

(30) Foreign Application Priority Data

Jul. 20, 2018 (EP) .................................... 18184823

(51) Int. Cl.
*G02B 21/36* (2006.01)
*G01N 21/21* (2006.01)
(Continued)

(52) U.S. Cl.
CPC ........... *G02B 21/365* (2013.01); *G01N 21/21* (2013.01); *G01N 21/6458* (2013.01);
(Continued)

(58) Field of Classification Search
CPC .... G02B 21/365; G02B 21/08; G02B 21/086; G02B 21/16; G02B 21/008; G02B 21/082;
(Continued)

(56) References Cited

U.S. PATENT DOCUMENTS 10,872,420 B2 * 12/2020 Shukla ...................... G06T 5/20
2015/0185459 A1    7/2015 Clark et al.

FOREIGN PATENT DOCUMENTS

DE    102012007045 A1    10/2013
DE    102014108044 A1    12/2015
(Continued)

OTHER PUBLICATIONS

Litjens et al., A Survey on Deep Learning in Medical Image Analysis, Medical Image Analysis, Dec. 2017, vol. 42, p. 60-88.
(Continued)

*Primary Examiner* — David P Porta
*Assistant Examiner* — Gisselle M Gutierrez
(74) *Attorney, Agent, or Firm* — Rudy J. Ng; Bret E. Field; Bozicevic, Field & Francis LLP (57) ABSTRACT

The invention relates to a method for microscopic evaluation (120) of a sample (2), in particular at least one uncolored object or cell sample (2), in an optical detection system (1), where the following steps are performed:
providing at least two different detection information (110) about the sample (2), in particular by the detection system (1),
performing an evaluation (120) of the detection information (110), in particular by an analysis means (60), on the basis of machine-learned transfer information (200), in order to determine result information (140) about the sample (2),
the transfer information (200) being trained for a different detection parameterization of the detection information (110), in which the detection information (110) differs from one another in terms of at least one illumination parameter of the detection system (1), in particular in terms of polarization and/or color coding.

15 Claims, 5 Drawing Sheets

(51) Int. Cl.
*G01N 21/64* (2006.01)
*G02B 21/08* (2006.01)
*G02B 21/16* (2006.01)
*G06N 3/04* (2006.01)
*G06N 3/08* (2006.01)

(52) U.S. Cl.
CPC ........... *G02B 21/08* (2013.01); *G02B 21/086* (2013.01); *G02B 21/16* (2013.01); *G06N 3/04* (2013.01); *G06N 3/08* (2013.01); *G01N 2021/6471* (2013.01)

(58) Field of Classification Search
CPC .. G02B 21/0032; G02B 21/361; G02B 21/14; G02B 21/125; G01N 21/21; G01N 21/6458; G01N 2021/6471; G06N 3/04; G06N 3/08; G06K 9/00134; G06K 9/00147; G06K 9/2027; G06K 9/4628; G06K 9/4652; G06K 9/627; G06K 9/6289; G06T 15/506
USPC ...................................................... 250/459.1
See application file for complete search history.

(56) References Cited

FOREIGN PATENT DOCUMENTS

| WO | WO9120048 A1 | 12/1991 |
| WO | WO9711350 A2 | 3/1997 |
| WO | WO2016191462 A1 | 12/2016 |
| WO | WO2017181044 A1 | 10/2017 |

OTHER PUBLICATIONS

Horstmeyer et al., Convolutional neural networks that teach microscopes how to image, arXiv:1709.07223v1 [cs.CV], Sep. 21, 2017, p. 1-13.
Jo et al., Quantitative Phase Imaging and Artificial Intelligence: A Review, IEEE Journal of Selected Topics in Quantum Electronics, vol. 25, No. 1, p. 1-14, Jan.-Feb. 2019, Art No. 6800914.
Ronneberger et al., U-Net: Convolutional Networks for Biomedical Image Segmentation, arXiv:1505.04597v1 [cs.CV], May 18, 2015, p. 1-8.
Extended European Search Report for European Patent Application No. 19185963.6, dated Dec. 17, 2019, with its English summary, 14 pages.

* cited by examiner

METHOD FOR MICROSCOPIC ANALYSIS

This invention relates to a method for the microscopic evaluation of a sample. The invention also relates to an optical detection system, a computer program and a computer-readable medium.

It is known from the state of the art that detection systems such as microscopes are used for transmitted light microscopy for the analysis of cell samples. Methods such as transmitted light microscopy offer a reliable and established method for the analysis of cell samples and are mostly based on a comparatively technically simple and thus more cost-effective structure. Nevertheless, the information content available about the sample to be examined may be lower than with more complex microscopy techniques such as fluorescence microscopy or confocal microscopy.

A microscopy technique of the same type is known, for example, from WO 2017/181044 A1.

It is therefore an object of the present invention to at least partially reduce the aforementioned disadvantages. In particular, one object of this invention is to improve the analysis of samples while at the same time reducing the technical effort involved.

The above object is solved by a method with the features, an optical detection system with the features, a computer program with the features, and a computer-readable medium with the features as described herein. Further features and details of the invention result from the respective dependent claims, the description and the drawings. Features and details which are described in connection with the method according to the invention also apply, of course, in connection with the optical detection system according to the invention, the computer program according to the invention as well as the computer-readable medium according to the invention, and vice versa in each case, so that with regard to the disclosure to the individual aspects of the invention mutual reference is or can always be made.

From WO 97/1 1350 A2, DE 10 2014 108044 A1, WO 91/20048 A1, WO 2016/191462 A1, US 2015/185459 A1 and LITJENS GEERT ET AL: "A Survey on deep learning in medical Image analysis", MEDICAL IMAGE ANALYSIS, vol. 42, pages 60-88, XP085240547, ISSN: 1361-8415, DOI: 10.1016/J.MEDIA.2017.07.005, generic methods are known. Thus, the WO 97/1 1350 A2 reveals a neural network assisted multi-spectral segmentation method in which three images of different optical bands are recorded for one sample.

The object is solved in particular by a method for microscopic evaluation of a sample, in particular at least one uncolored object or cell sample, in an optical detection system.

It is advantageous that at least one of the following steps can be performed in a method according to the invention, whereby the steps are preferably performed one after the other in the specified sequence or in any order, and if necessary individual steps can also be repeated:
  providing at least two different detection information about the sample, in particular by said detection system,
  performing an evaluation of the detection information, in particular by an analysis means (in particular based on machine learning), preferably by means of transfer information taught by machine and/or by a neural network, in order to determine result information on the sample.

The transfer information is, for example, a digitally non-volatile stored piece of information which has arisen from a learning method (e.g. according to machine learning). The transfer information may include, for example, a classifier or a model or the like. The preferred feature of transfer information is that it was generated automatically by artificial intelligence (i.e. in particular in the learning method of a neural network) or the like.

It is optionally possible that the transfer information (in particular for transferring the detection information to the result information) is trained for a different detection parameterization of the detection information. Advantageously, with this different detection parameterization, the detection information can differ from each other at least with regard to one illumination parameter of the detection system (e.g. coded, in particular polarization and/or color coded). This has the advantage that relevant information about the sample can be extracted with high reliability and in particular without exact knowledge of the optical detection system or an underlying model. The transfer information may designate any classifier (e.g. a weighting for a neural network) if it has been taught for a different detection parameterization of the detection information.

In particular, it is possible to operate a method in accordance with the invention using the transmitted light method for transmitted light microscopy (e.g. using a transmitted light microscope as an optical detection system). In addition, it is conceivable that the evaluation may be performed at least in part through the use of self-learning methods, particularly in the field of machine learning.

Advantageously, self-learning methods can be understood to mean a monitored training (machine learning), for which a ground truth is generated without manual intervention (e.g. without annotations). For example, a motorized sample stage can be used to automatically move the sample and thus be able to detect different areas of the sample or different samples for a reference detection.

The detection parameterization is to be understood thereby preferably as a setting of parameters with the detection with the optical detection system, so that by the different detection parameterization different detection information can be detected. In other words, for example, a first setting (i.e. a first parameterization) may detect first detection information and a second setting (i.e. a second parameterization) different from the first setting may detect second detection information, etc. The data detection information may differ depending on the data detection parameterization used. The detection parameterization may therefore be a setting on the detection system, such as a setting of an illumination angle and/or an illumination structure and/or an illumination pattern and/or a polarization and/or a color filtering of an illumination light e.g. the condenser.

It may be possible that the provision of the at least two different detection information is made by an analysis means, such as a computer program or electronics or at least a processor, and/or by a computer. Alternatively, or in addition, provision may be made by the detection system, where the detection information is specific to detection by the optical detection system. In this case, it is advantageous if the provision is performed as a detection by a detection device, such as a camera of the detection system. For this purpose, the detection device is configured, for example, with at least one sensor which is aligned with an illumination light (of the detection path) for detection, the illumination light being influenced by the sample. The illumination light is generated e.g. by a condenser, and/or changed by an illumination means, and/or is changed by the sample by being emitted onto the sample and thus illuminating it.

Furthermore, it may be possible within the scope of the invention that the means of evaluation is executed as a computer program, in particular a computer program product. Preferably, the computer program can only be available in a permanent, non-transitory form, e.g. on a physical data memory such as a hard disk or flash memory or the like. The analysis means may be suitable to be performed by an evaluation device in order to perform at least one method step of a method in accordance with the invention at least in part. The evaluation device is, for example, a computer or electronics or at least a processor which can be connected to at least one data memory for executing the analysis means. This connection is, for example, an electrical circuit and/or a signal connection to read the analysis means from the data memory. Furthermore, the evaluation device may comprise at least one processor for performing the analysis means read out. If necessary, at least one intermediate memory can also be used for this purpose, e.g. in order to temporarily store the at least one detection information and/or the transfer information and/or the result information between. In addition, the transfer information can also be stored permanently (non-volatilely) in a data memory of the evaluation device. Optionally, the evaluation device may also be electrically connected to at least one component of the optical detection system, e.g. a detection device, for control and/or evaluation and/or provision purposes. In this way, it is possible for the evaluation device to receive the detection information from the detection device and store it, for example, in the buffer memory or in the data memory.

Advantageously, the detection information may also be provided by a detection device of the detection system detection a light directed at the detection device, said light being specific for a variation of an illumination light by the sample and/or depending on the illumination parameter. The illumination parameter is, for example, a setting of an illumination angle of the illumination light and/or an illumination color of the illumination light and/or a polarization of the illumination light and/or a spatial property (structure) of the illumination light.

Furthermore, it is conceivable that the detection information may be coded from one another at least with regard to the illumination parameter of the detection system, in particular polarization or color coded. Color-coded differentiation is enabled, for example, by using a different illumination color for different illumination parameters (or a different illumination parameterization). For this purpose, an illumination device is used, for example, to achieve color filtering of the illumination light as a function of the illumination parameter. The illumination means can be configured as a spatially structured color filter for this purpose. The illumination parameter is, for example, a spatial structure or an angle which is set differently for different detection information. Thus, the illumination parameter can also affect a different structure of the illumination light for different detection information. In order to assign the resulting light to the different detection information, the coding, e.g. color coding (i.e. color filtering) or polarization coding, can be used accordingly. In this way, different illumination properties, such as illumination colors or polarizations, which can be obtained, for example, from a detection device, are assigned to different detection information in order to provide them. The different illumination properties can alternatively or in addition to the illumination color (the color coding) also affect a polarization of the illumination light (the polarization coding).

In addition, it is optionally possible in an inventive method that the detection information is specific to a detection of the sample by the optical detection system where the detection parameters for the detection information differ. Alternatively or additionally, the detection parameterization may differ at least by a variation of an illumination parameter of the detection system. The variation is for example a color variation or a different polarization of an illumination light, and is controlled in particular by an evaluation device and/or by an illumination device. The illumination means can be configured as a color or polarization filter, for example.

The invention may provide for the detection information to be coded differently, at least as regards the illumination parameter of the detection system. The coding is done in particular by changing at least one property of the illumination light in a predefined way in order to be able to distinguish the changed illumination light from other illumination light when providing (in particular capturing) the detection information. This change, i.e. coding, can then be made differently and distinguishably for different spatial positions or areas of the illumination light, for example. Thus, different illumination patterns are formed, which differ from each other at least by the coding. Then from each of the different illumination patterns or for each different coding at least one of the detection information can be generated, which then only contains information from this illumination pattern or from this correspondingly coded illumination light. For example, a different polarization of the illumination light is used as coding. For example, a detection of the sample using this illumination light coded in this way is separated for the different polarizations, so that detection information is generated for each of the different polarizations. The different polarization (e.g. in the area of a condenser) can occur before the illumination of the sample by the illumination light. The detection information may contain different information about the sample due to the different paths of illumination light in the detection system. The aforementioned version also applies to other types of coding, such as color coding.

It may be advantageous in the method according to the invention that the evaluation uses the difference of the detection information, in particular uses differences specific to the sample and/or caused by the sample, in order to obtain at least one resulting information about the sample such as the result information. The difference in structure, i.e. the different illumination patterns used to record different detection information, is advantageously decisive for the emergence of this difference. The different detection information may also differ, for example, in the coding of the illumination light used to record the detection information. However, this may be a predefined difference to the coding and not a difference caused by the sample. The coding can be color coding or polarization. The evaluation or provision thus in particular does not upgrade the different coding in the sense of information about a sample property in order to obtain the result information, but when necessary only for decoding and providing the result information. For example, different colors of a detection of a detection device are used as information for decoding by the evaluation or provision and possibly not as a spectral change of the illumination light by the sample.

It is conceivable that, before the evaluation, the detection information may be made available (made available) by different detections of illumination light (modified by the sample) being performed by a detection device of the detection system for decoding purposes, preferably simultaneously and/or in parallel, in order to determine in each case a different one of the detection information on the basis of the respective detection, the detections differing in the properties of the illumination light.

In particular, the detection information is provided in such a way that a single one of the detection information does not show any differences in the illumination parameter and/or the property of the illumination light, i.e. it is generated, for example, only by the illumination light of a single property such as a single color or polarization. In particular, the differences may only be discernible for different collection information.

It is also conceivable that several types of coding, e.g. color and polarization coding, can be used in combination. The different polarization of the illumination light includes, for example, different polarization types (such as linear and circular polarization) or different polarization directions or different polarization patterns or the use of polarized and different non-polarized illumination light. Other properties of the illumination light than color or polarization can also be used for coding if necessary.

The provision can be e.g. also the reading of the detection information initiated by the analysis means from a data memory or an interface to the detection system. Such an interface may, for example, have a signal connection and/or electrical connection to a detection device of the detection system.

It may be possible that the next step is intended for provision:
performing at least one detection of the sample by the optical detection system to obtain the different detection information by varying the illumination parameter, wherein the variation is expressed as a change
the spatial illumination structure and the illumination color and/or
the spatial illumination structure and illumination polarization
for the different detection information. Optionally, the illumination color and (alternatively or additionally) the illumination polarization can encode the illumination patterns generated by the spatial illumination structure.

It may also be possible that the next step is intended for provision:
performing at least one detection of the sample by the optical detection system to obtain the different detection information by varying the illumination parameter, wherein the variation takes place as a change in the spatial illumination structure and/or the illumination color and/or the illumination polarization for the different detection information, wherein preferably for this purpose an illumination light is spatially structured and/or for color coding is at least two-colored and/or for polarization coding is polarized differently, so that in particular different illumination patterns dependent on color and/or polarization are produced, and preferably these illumination patterns are specific for the detection information. In particular, the illumination patterns changed by the sample (which have passed through the detection system and/or the sample) can be detected by the detection information. These contain the relevant information about the sample. This has the advantage that by varying the illumination parameter, different detection information can be provided in order to increase the information content of the sample detection through evaluation, in particular processing of the detection information. In particular, the variation of the illumination color for color coding or the polarization for polarization coding of the illumination light takes place in order to be able to extract the detection information in this way on the basis of the illumination color or the polarization. The spatial structuring of the illumination light is performed in particular to increase the information content, since in this way the illumination light can pass through the optical detection system in different ways. In this way, for example, multiplexing (in color if necessary) can be provided to acquire several images of the sample simultaneously and/or in parallel. The images correspond, for example, to the data detection information.

If the illumination patterns are suitably shaped by the illumination structure, several images of the sample can be taken in parallel with an optical detection system and without loss of time. It is conceivable that the optical properties of the optical detection system (i.e. in particular the imaging microscope system) depend on the light color of the illumination light, for example via chromatic aberrations. In principle, it is conceivable that the optical detection system or its optical properties may be modulated and that this physical model may provide additional information during sample detection. Through the use of the semi-skilled transfer information, and in particular also in combination with self-learning evaluation methods, such modelling can at least partially be dispensed with, whereby the gain in information is still possible or improved. This way can be overcome, if necessary, also the restriction that with physical models only such information is extractable on the basis of the detection information for which there is a correspondence in the physical model. Furthermore, such methods are fundamentally dependent on the fact that the real system corresponds to the model to a good degree. The use of the learned transfer information can be understood to mean that the model is automatically generated by artificial intelligence. The evaluation of the detection information may also include, where appropriate, a self-learning object analysis or a self-learning cell analysis of the sample to obtain additional information on the sample based on the difference in the detection information.

It is also conceivable in the case of the method according to the invention that the illumination light is coded in such a way, e.g. at least two-colored or polarized, and/or spatially structured in such a way that different illumination patterns occur depending on the coding, i.e. for example depending on color and/or polarization. Where appropriate, different colored and/or polarized illumination patterns may pass through the optical detection system in different ways, thereby producing different images, i.e. different detection information. Different colors are understood in particular to mean different wavelength ranges.

Advantageously, different colors are particularly those wavelengths of the illumination light which differ at least by 10 nm or at least by 20 nm or at least by 50 nm or at least by 100 nm or at least by 200 nm. Also, such different colors may be wavelength ranges which are at least 10 nm or at least 20 nm or at least 50 nm or at least 100 nm or at least 200 nm apart. Thus, an illumination light with at least two colors can be spatially structured, for example, in such a way that it has spatially different colors and/or different spectra. In particular, the color and/or spectrum of the illumination light can vary spatially orthogonal to the direction of propagation of the illumination light in the optical detection system. In other words, a multicolored illumination light has several colors (i.e. in particular several different spectra according, for example, to the wavelength ranges mentioned above), which in the case of spatial structuring may be spatially different for the illumination light. According to another point of view, the illumination light can be understood as several light beams of different light color, which take different paths in the optical detection system.

It is conceivable that the same spatial sample area is at least partially covered by each detection information. In other words, a first of the collection information may (only partially) contain different information than a second of the collection information, so that the overall information content can be increased. The detection information is e.g. (possibly independent) detections (e.g. microscope images) of the same sample location. For example, the respective detection information is specific and/or dependent on a particular record and corresponds, for example, to data output from a detection device.

It is advantageous that the different detection information is specific to different colored and/or differently polarized illumination patterns, in particular the detection information is different as regards the colors or polarization of the illumination patterns. The different illumination patterns are caused, for example, by a change in the illumination light of the optical detection system, where the change in the illumination light is at least two-colored and/or at least three-colored and/or spatially structured in such a way that the different illumination patterns occur depending on color or polarization. Thus, the (e.g. different colored) illumination patterns can pass through the optical detection system in different ways and thus produce different images. A detection device, in particular a camera, may be a type that it can produce two or three or more separate color images in the detection system. In particular, the images from the different color ranges or different polarizations are kept separate during detection. The evaluation can then be performed if necessary, e.g. a trained neural network can be applied to the images. The images correspond in particular to the different detection information. The evaluation can, for example, be performed with the aim that a classification or regression of pixels, objects, sample areas or entire samples is performed from the images and/or the detection information. It may be possible that the neural network has previously been trained on detections of a similar type in order to perform the corresponding classification or regression.

In particular, it may be possible for the evaluation to use a neural network that initially monitors and/or autonomously learns how to extract the relevant information from the existing, generally abstract information of the image data or color images using similar image data (e.g. the detection information) independently of a physical model. In a first step, the abstract information of the acquired image data or color images (i.e. in particular the detection information) and preferably the corresponding relevant information can be presented to the neural network at this point of the sample (such as markings of relevant areas or the three-dimensional structure of the sample). In this way, for example, an abstract model for the transfer from abstract information to relevant information can be learned. For example, the transfer information is specific to this abstract model, which can be much more adaptable and/or flexible than a realistic physical model and can also be learned without the need for special assumptions about the optical system. If necessary, the learned model can be used in a further method step to extract the desired relevant information from unknown image data or color images with comparable abstract information.

It is possible in the context of the invention that when using a coding, such as color coding or polarization coding, each coding (such as a used color of polarization) of the illuminating light is associated with a particular illumination pattern caused by the spatial structuring of a illumination means and/or with a particular illumination angle of the illuminating light, whereby the illumination patterns or illumination angles differ from each other. For example, the illumination angles differ by at least 5° or 10° or 20° (e.g. with respect to an angle of incidence on the sample or an angle of reflection from the condenser or illumination means). It is conceivable that the illumination of the sample is performed simultaneously and/or parallel with all coding, such as illumination colors or polarizations (and thus also with all different illumination patterns and/or illumination angles) or that sequentially only individual coding (e.g. illumination colors or polarizations) or illumination angles successively illuminate the sample, and thus the detection information is detected sequentially.

Furthermore, it is optionally foreseen that the evaluation is performed by an analysis means which is executed as a computer program based on machine learning and/or deep learning and/or artificial intelligence, preferably as an artificial neural network. It is possible that the evaluation is performed independently of a concrete physical model of the optical detection system, e.g. on the basis of learning and, in particular, self-learning methods. For example, the transfer information can be based on a learning outcome, such as a classifier or a model, which is the result of at least partially supervised and/or unsupervised learning. This allows the evaluation to be based on correlations and models that do not have to be specified and can therefore be generated automatically.

It is particularly advantageous if deep learning methods are used in the learning method. Accordingly, the transfer information can be specific to such deep learning methods. In particular, these methods are optimization methods of artificial neural networks, which have numerous hidden layers between the input layer and the output layer and thus have an extensive internal structure.

It may also be possible that the detection parameterization of the detection information differs from each other in that, when the detection information is detected, an illumination light of the detection system, in particular broadband illumination light, has different spatial and/or coded adaptations for different of the detection information, preferably by spatial structuring and/or color coding and/or polarization of the illumination light. In particular, this further development is based on the idea that light of different coding, e.g. light of different colors, passes through an identical optical system independently of one another. With appropriate shaping of the different encodings, and/or with different illumination colors, if necessary, solely by the chromatic aberrations of the optical system (i.e. the detection system), different optical images (e.g. the detection information) can be produced for different encodings (such as colors or polarizations). Using a suitable detection device, e.g. a detector such as a digital color camera with polarization and/or color filter sensor, preferably a Bayer sensor, several images with different coding can then be recorded independently or partially independently of each other in parallel. A set of these images can then be stored as a polarization and/or color image, for example. While for a few special illumination situations, e.g. oblique illumination with several different angles, it is known that a set of detected images contains more information than a single image and, in particular, how this information is to be interpreted concretely, the possible use of different coding such as illumination colors according to the invention appreciates that the information gain is practically always present when the lighting is coded (e.g. color coded) structured. Through coded shaping, especially color shaping of the lighting, image information is maximized, which can then be stored in a coded image, e.g. a color image. From this coded image, for example, the detection information can then be extracted.

In addition, it is advantageous if the different detection parameterization of the detection information is specific to the fact that, during an detection, an adaptation of an illumination light is performed by means of an illumination means of the detection system, wherein the illumination means has a coded, preferably differently polarizing and/or at least two-colored, spatial structure in order to provide different illumination patterns for the sample as a function of coding, preferably color-dependent and/or color-coded and/or polarization-dependent and/or polarization-coded, wherein different of the detection information are provided in particular for different of the illumination patterns. The different and in particular differently colored or polarized illumination patterns pass through the optical system in different ways and thus generate different detection information (e.g. image detections). This allows different images to be produced, whereby a detection device (such as a camera) can produce two or more images for this purpose, which are separate in terms of color, coding or polarization. The images from the various encodings, in particular color areas, can be kept separate.

In order to obtain a polarization coding and/or color coding, in particular to obtain a polarization-coded and/or color-coded structured illumination with illumination patterns, the illumination means may, for example, be arranged in a beam path of the illumination light (illumination path). For example, the illumination fixture is configured as a color filter. The illumination means may also be placed in a Fourier plane of the sample in the illumination path or in the detection path. For example, the broadband illumination light illuminates the sample and is only then color-coded in the detection path—modified by the sample. The illumination means can also be configured as a polarization filter.

An optional possibility for achieving color-coded structured, i.e. in particular spatially structured and colored, illumination is the use of Rheinberg illumination or multicolored spatially arranged illumination means (such as LEDs or LED arrays). If necessary, the illumination means can also have the illumination means. For a polarization-coded structured, i.e. in particular spatially structured and polarized, illumination, e.g. a segment-shaped arrangement of linear polarization filters can be used as illumination means. Further possibilities are the use of a Wallaston Primas or a radial or azimuthal polarized illumination.

For example, to provide the detection information, the (e.g. broadband and/or non-polarized) illumination light passes through the illumination means, is encoded (polarized or color-filtered) by it and then illuminates the sample and is only then detected by the detection device, modified by the sample.

It is also optionally conceivable that the different detection parameterization of the detection information is specific to the fact that detection of the detection information takes place by simultaneous and/or parallel illumination with different illumination colors (such as light colors or wavelengths) and/or polarizations, wherein at least one color-dependent and/or polarization-dependent, in particular two-dimensional or multi-dimensional, sample detection is performed in order to provide the at least two detection information color-dependently and/or polarization-dependently. For example, the sample detection may be multidimensional and, for fast and reliable detection, multiple detections may be generated simultaneously and/or in parallel by at least one filter, such as a polarization and/or color filter, on one detection device. The detections can be detection information of differently filtered illumination light.

Furthermore, it is optionally possible, within the scope of the invention, that at least one sample detection is performed by a detection device, in particular a camera, of the detection system by means of polarization and/or color filtering in order to provide different detection information for different polarizations and/or illumination colors from the sample detection in order to provide at least one sample detection, the detection device preferably having at least one polarization filter for polarization filtering and/or a color filter, in particular a color filter pattern and/or RGB filter pattern and/or Bayer filter for color filtering. The polarization and/or color filter can, for example, be arranged on an array of sensor elements such as photodiodes or the like. At least one color filter, in particular several color filters in a color filter pattern, may also affect non-visible light (in the non-visible spectrum). This enables simple and reliable provision of the detection information depending on the filtering of the detection device.

It is also possible for a detection device to have a polarization-sensitive sensor, in particular for detection the illumination light (modified by the sample) and/or for acquiring (providing) the detection information. The illumination light changed by the sample is e.g. changed by the transmission through the sample, e.g. spatially differently attenuated. Such changes can be detected by the sensor. In order to differentiate between differently polarized illumination light, which has been polarized by an illumination means, for example, the polarization-sensitive sensor can detect illumination light of different polarizations separated and/or distinguishable from each other. For this purpose, e.g. polarization filters can be provided, which are each assigned to at least one pixel. For example, the sensor can be a CMOS or CCD sensor, which additionally has at least one polarization filter. This at least one polarization filter is attached directly to the sensor chip, for example. For example, the polarization filter is disposed between at least one photodiode of the sensor and at least one micro lens of the sensor to filter light passing through the micro lens and then pass it filtered to the photodiode. Thus, the photodiode can only detect light of a certain polarization, which can then be used to generate a certain detection information for this polarization. For other polarizations, correspondingly different polarization filters and detection information can be used with other photodiodes.

It is also optional for the following steps to be performed to make it available:
  detecting a first image of an area of the sample, preferably with a first illumination color and/or polarization, to obtain a first detection information according to a first detection parameterization,
  detecting at least one second photograph of an at least partially identical area of the sample, preferably with at least one second illumination color and/or polarization different from the first illumination color and/or polarization, in order to obtain at least one second detection information according to at least one second detection parameterization,
preferably the detections being determined in parallel according to a coded and/or colored multiplexing. In this way it is also possible, for example, to use spatial coding as a spatial variation of illumination polarization. This can have the same advantages as described in connection with color-coded multiplexing. In particular, several coded detection information about the sample can be acquired simultaneously and/or in parallel in this way, so that sequential illumination of the sample for the different coding is not necessary.

Optionally, it may be possible for the above steps to be repeated for further (e.g. third, fourth, etc.) detections and detection information, with all detection information being available, e.g. as a single set of application data. For example, the steps can be performed simultaneously and/or in parallel or sequentially.

Furthermore, it may be provided within the scope of the invention that the evaluation is performed by an analysis means which has the transfer information, the following steps being performed in order to train (i.e. in particular train) the analysis means:

performing a detection of an area of the sample by the or a further optical detection system in order to obtain at least two different training information about the sample by varying at least one detection parameter, in particular illumination parameter, for the training information, Determination of application data for the analysis means based on the training information, performing a reference detection of the same area of the sample by the further optical detection system(s) and/or (automated) processing to determine a ground truth (e.g. as a predetermined solution or as a target for the result information) for the analysis means, Learning the analysis means using the application data and ground truth to determine the transfer information.

It is possible to perform fluorescence microscopy for reference detection and/or segmentation of a reference detection record for ground truth determination. For example, the detection system, in particular the microscope, can be used to capture ground truth. It may also be possible that the content of the training information corresponds to the content of the detection information so that the training method is adapted to information of the same type as the detection information. In addition, the training method can also use a self-learning method to perform the training on the basis of sample-specific characteristics.

It is conceivable that the ground truth is determined from cytometric or histological analysis results obtained from the reference detection. Alternatively or additionally, it is conceivable that the ground truth may also be calculated, if necessary without a reference detection being performed.

Furthermore, it is optionally provided that the sample is a colored object or cell sample, wherein the evaluation for detection information about this sample performs a detection, in particular segmentation or localization of these objects and/or cells of the sample. In other words, the detection of the coloration can be done by the evaluation. The evaluation for the staining of the sample can also be performed sensitively.

In addition, in a method according to the invention, it is possible that the ground truth is determined by an automated detection, in particular an automated execution of the reference detection. Motorized sample positioning, e.g. using a motorized sample stage that can be moved in three orthogonal directions, is also possible. Sample positioning, for example, is automatically controlled by a computer program. This allows a fast and reliable determination of the ground truth. Since a method of this type does not require manual annotation, it can be described/understood as self-learning.

Furthermore, the provision of at least two different detection information may also be affected by detection one or more levels of the sample. Motorized sample position z, e.g. by means of a motorized and moveable sample stage that can be moved in three orthogonal directions, can also be performed. For example, a gradual movement of the sample and/or the lens of the detection system can performed in order to detect different levels of the sample (e.g. in the z-direction of the sample, in particular in the expansion direction of the illumination light in the sample).

It is advantageous to provide that a method according to the invention is sample-specific, so that the method is only suitable for the evaluation, in particular analysis, of a certain type of sample (e.g. for blood smears). In this way, sample-specific optical properties can be used in a targeted manner. In other words, the method can be adapted to a specific sample type, or it can be trained for a specific sample type.

Furthermore, it is optionally possible that the result information, and/or a ground truth for the training of an analysis means, in a method according to the invention, relates to a prediction of a cell or cell lump development in time. Thus, it is possible to predict such a development on the basis of a short temporal development or the initial morphology of the sample. For example, the sample, especially as a cell sample, can first be observed from a certain point in time. This observation may, for example, take the form of the repeated provision of detection information. In other words, it is also conceivable in principle in a method according to the invention that the detection information is recorded at different points in time and differs with regard to this point in time. The evaluation can then be used to determine the forecast, if necessary. According to this or such a method (the provision of the detection information as training information and/or the described evaluation) the ground truth can be determined beforehand, if necessary. In order to train the analysis means, for example, detection information is recorded sequentially and repeatedly and thus made available in order to determine the application data for the analysis means. At a later stage, a reference detection can then be performed on the same sample as the detection information. The reference detection can then be used to determine the ground truth, which can be used to train the analysis means and to determine the transfer information. The resulting transfer information can then also be used for predicting other samples of the same type.

A further advantage within the scope of the invention can be achieved if the result information, and/or a ground truth for training an analysis means, is one of the following information about the sample:

detection, in particular segmentation or localization of objects and/or cells of the sample, in particular a segmentation mask, an estimate of the classification or regression of pixels or objects or sample areas of the sample, a cytometric or histological analysis result (e.g. obtained for ground truth using established methods of sample analysis such as high content analysis), phase information (e.g. for the ground truth from a complementary, established method of phase measurement), three-dimensional information about the spatial structure of the sample (e.g. the ground truth is a z-stack image), at least one fluorescence property of the sample (e.g. the ground truth is at least one fluorescence image of the sample), an extended depth-of-field range of a sample detection (e.g. Ground Truth is a corresponding image with an extended depth-of-field range of the sample).

This allows a versatile and flexible use of the method according to the invention.

In a further possibility it may be provided that for coded differentiation of the detection information, in particular when providing, a change of an illumination light, preferably by an illumination means, is performed in the detection system, preferably a spatial variation of an illumination polarization and/or an illumination color of the illumination light, which is preferably associated with a different illumination structure of the illumination light, and/or that the transfer information is specific for this differentiation. Thus, a multiplexing is conceivable, in which the illumination can be performed at the same time for the detection of several detection information.

An optical detection system is also the subject of the invention. Here it is intended that the detection system has the following components:
- a detection device for detecting at least two different detection information about the sample, which at least differ in coded form with respect to one illumination parameter in particular during detection,
- an evaluation device, such as a computer, in particular having at least one processor, which is suitable for determining result information about the sample from the detection information on the basis of machine-learned transfer information.

Thus, the optical detection system according to the invention has the same advantages as described in detail with regard to a method according to the invention. In addition, the optical detection system may be capable of performing a method in accordance with the invention.

In addition, the evaluation device may have an input device, such as a touch screen or at least a key, to initiate the evaluation, for example. A memory unit may also be provided in the evaluation device for non-volatilely storing at least the analysis means, e.g. as at least one computer program, and/or for at least temporarily storing the detection information. One or more processors of the evaluation apparatus may be capable of executing a computer program such as the analysis means to perform at least one procedural step of an inventive method.

Another advantage may be that an illumination means is provided which, for at least two different settings of the illumination parameter, has a spatial structure of different polarization and/or at least two colors, preferably having at least two polarization and/or color filters arranged adjacent (in particular in a plane orthogonal to the direction of light propagation of the illumination), in order to provide different illumination patterns as a function of polarization and/or color. The illumination fixture is configured, for example, to code the illumination light according to a position of the illumination fixture in order to easily vary the illumination parameters.

A further advantage can be obtained in the context of the invention if the illumination means is configured as a condenser insert and is used to filter an illumination light into a condenser unit of the optical detection system to provide coding, in particular polarization and/or color coding of the illumination light. This allows the illumination light to be coded and spatially structured by a simple extension of a detection system. For example, it can be advantageous to use a detection system which is at least predominantly independent of the evaluation used. Only the use of the illumination means and/or an adaptation of the detection device and/or the evaluation device may be sufficient for use with the evaluation according to a method in accordance with the invention. This results in a significant reduction of the technical expenditure.

An advantageous feature of the invention may be that the detection device has at least one camera sensor, preferably an RGB camera sensor (RGB here stands for red, green, blue, for example as possible color filters of the camera sensor), and/or is configured as a polarization-sensitive camera in order to preferably decode the illumination light. It is conceivable that the detection device may detect in transmission mode in the detection system to provide the detection information. Alternatively or additionally, the detection device may be configured to decode the illumination light by the detection device having a decoding means, such as a color filter or a polarization filter.

It may also be advantageous in the context of the invention to increase a numerical aperture of the detection system (e.g. on the condenser side), in particular by using a lens. Especially with thin samples, this has the advantage that more information can be extracted from the sample and a higher information density is available.

Furthermore, the invention may provide that the optical detection system is configured as a microscope system for transmitted light microscopy, in particular for sample evaluation in transmission mode.

Another subject matter of the invention is a computer program, in particular a computer program product, comprising instructions which, when the computer program is executed by a computer, cause the computer program to at least partially execute the steps of a method according to the invention. Thus, the computer program according to the invention has the same advantages as described in detail with regard to a method and/or detection system according to the invention. In addition, the computer program may be capable of performing at least one procedural step of a method conforming to the invention by controlling a system of detection conforming to the invention. The computer program can optionally also be executed as a downloadable digital signal.

Another subject matter of the invention is a computer-readable medium on which a computer program according to the invention can be stored. Thus, the computer-readable medium according to the invention has the same advantages as described in detail with regard to a computer program according to the invention. The computer-readable medium is, for example, configured as a (permanent or non-transitory) data memory, such as a flash memory or a hard disk or the like. The computer-readable medium can optionally also be configured as a downloadable digital signal.

Advantageously, a computer program and/or a computer program product and/or a computer-readable medium may have an analysis means comprising instructions which cause the optical detection system in accordance with the invention to perform at least one of the method steps of a method in accordance with the invention.

Further advantages, features and details of the invention result from the following description, in which embodiments of the invention are described in detail with reference to the drawings. The features mentioned in the claims and in the description may be essential to the invention either individually or in any combination. It is shown:

In the following figures, the identical reference signs are used for the same technical characteristics, even for different embodiments.

Figure 1:
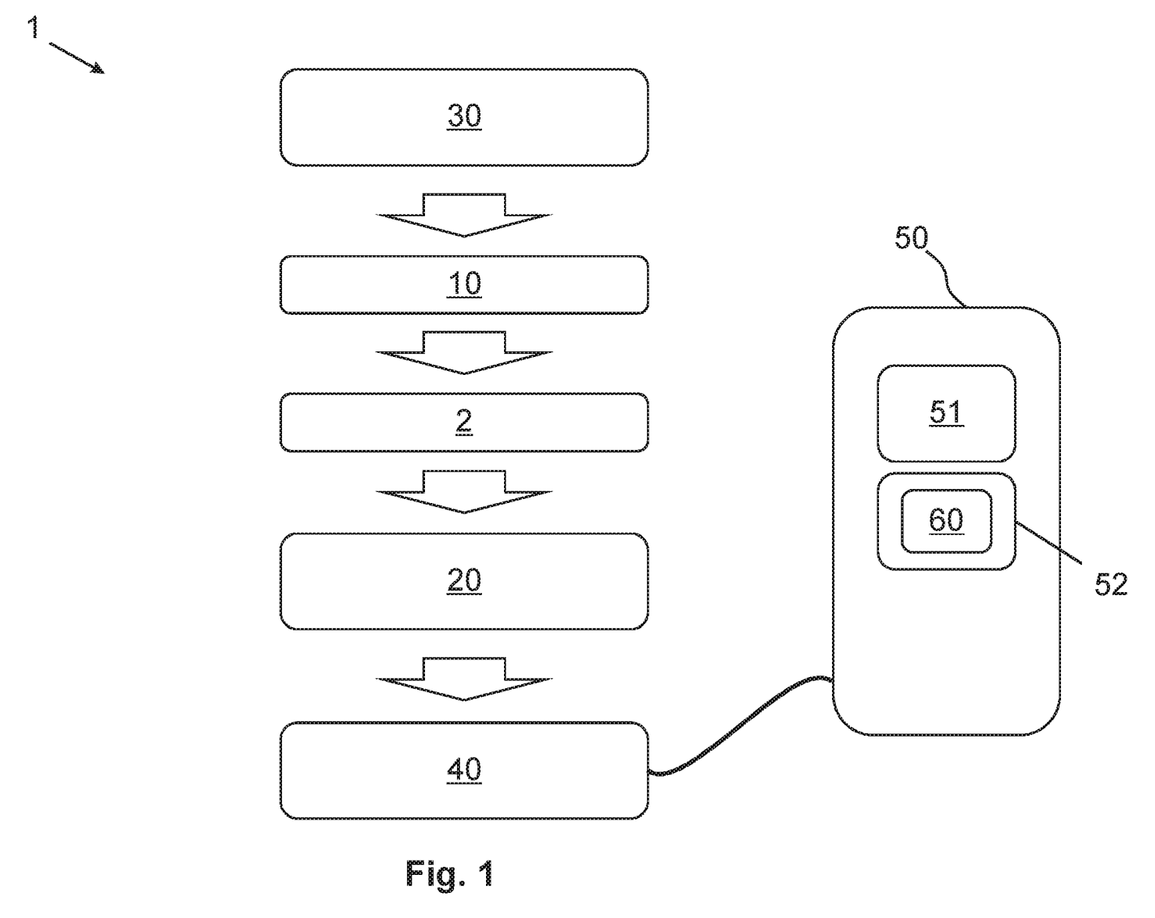
FIG. 1 a schematic representation of a detection system according to the invention, in particular an arrangement for microscopy of uncolored cell samples, FIG. 2 a schematic representation of an illumination means, FIG. 3 a schematic representation for the visualization of a method according to the invention, FIG. 4 a further schematic representation for the visualization of a method according to the invention, FIG. 5 An optional version of parts of an analysis means.

FIG. 1 schematically shows an optical detection system 1 in accordance with the invention, which has a detection device 40 and an analysis device 50. The optical detection system 1 (with the possible exception of the analysis device 50) can be configured as a microscope for transmitted light microscopy. For example, a broadband (e.g. white) light source 30 can be used as illumination (i.e. to generate the illumination light). In order to provide different illumination parameters coded during the detection, an illumination means 10 can be provided in the detection system 1. This illumination means 10 is used, for example, in a microscope condenser in detection system 1 in order to encode and/or spatially change the illumination light using the illumination light before illuminating sample 2. In this way, the illumination means 10 can provide different illumination patterns, e.g. one for each coding. For example, illumination means 10 may be configured to imprint the color information "red", "green" and "blue" at different positions of the illumination light. This coded illumination light can then be used, for example, to illuminate sample 2 in normal transmitted light mode and to generate an enlarged image on detection device 40, in particular camera 40, using an optical system (such as imaging optics 20). The detection device 40, for example, is a color camera with a color filter—in particular a Bayer sensor—to take three individual images from the image into the spectral range in red, green and blue simultaneously. Alternatively or additionally, the camera can be equipped with at least one polarization filter in order to detect individual images for the different polarizations on the basis of the figure. The individual images correspond, for example, to the detection information. Optionally, the camera 40 can be configured as a polarization camera (polarization image sensor) or as a polarization-sensitive line sensor. Also, several cameras 40 are conceivable as detection device 40, e.g. each with polarization divider or polarization filter.

It may also be provided that the illumination light of each different coding passes through the optical detection system differently and independently of each other, so that different information about the sample is provided by the coding-dependent detection of the detection information. The individual images and/or the detection information 110 can then be transmitted from the detection device 40 to an analysis device 50, e.g. to perform an evaluation of the detection information 110 using a processor 51 and a data memory 52. For this purpose, the data memory 52 has, for example, an analysis means 60, such as a computer program.

Figure 2:
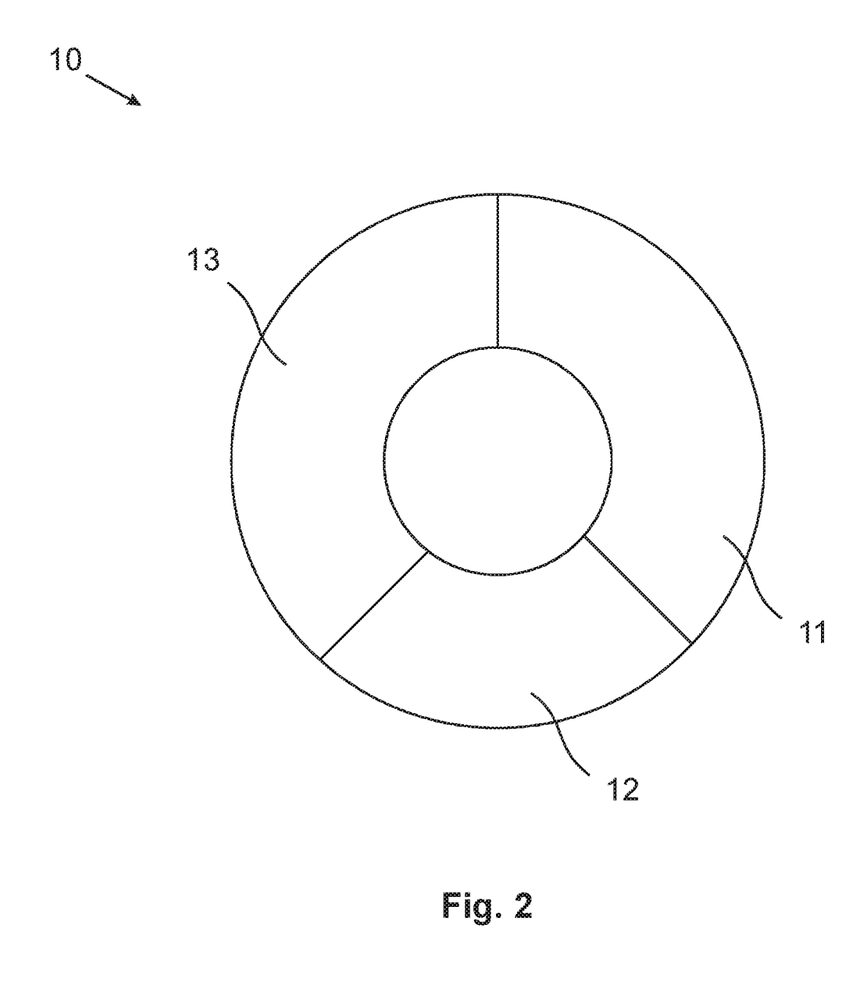

FIG. 2 shows an exemplary configuration of an illumination means 10. For example, the illumination means 10 is configured as a spatially structured filter, in particular a polarization and/or color filter. In addition, the illumination means 10 can be a transmission filter, which can be used, for example, in the microscope condenser of a transmission microscope. If the illumination means 10 has at least one color filter, it can produce a suitable adaptation of a broadband (white) illumination light for a color coding. If, for example, the coding is generated by a different polarization, the polarization of the illumination light for the coding can be changed accordingly. For example, different segments 11, 12, 13 of the illumination means 10 are provided for this purpose in order to generate different coding, such as color filters or polarization filters, through the segments. For example, a first segment 11 can be a red color filter, a second segment 12 a green color filter, and a third segment 13 a blue color filter. The illumination means 10 can be inserted into the detection system 1 in such a way that the illumination light (e.g. from the condenser and/or from the light source 30) strikes the surface shown in FIG. 2 in a plan view, is spatially changed by the segments 11, 12, 13 and then emerges again on the surface at the rear as shown in FIG. 2.

Figure 3:
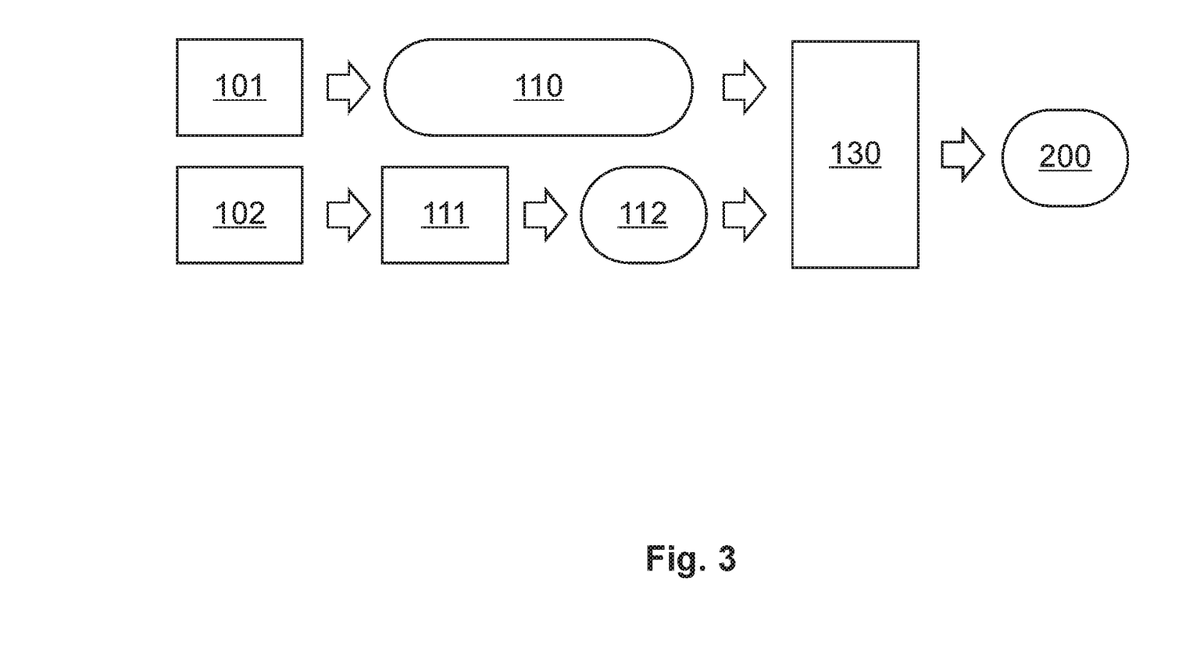

FIG. 3 schematically shows a training method for an analysis means 60, which can optionally be part of an inventive method. First of all, a detection 101 of an area of the sample 2 is performed here by the or a further optical detection system 1 in order to obtain at least two different training information 110 about the sample in that at least one detection parameter, in particular illumination parameter, varies for the training information 110. For the variation of the detection parameter, for example, illumination means 10 are generated by one illumination means, in particular by spatially structured filtering of the illumination light. The training information 110, for example, is executed as data records, which can correspond to the training information 110, for example. Application data for analysis means 60 can then be generated from this training information 110. A reference detection 102 or reference evaluation 102 can then be performed. Preferably, reference detection 102 is performed on the same area of sample 2 as detection 101. In this way, reference processing 111, in particular segmentation 111, can be used to determine a ground truth 112. Thus, the Ground Truth can be e.g. a segmentation mask which masks the relevant areas of the sample location of sample 2. An automated marking of the relevant sample areas can be achieved, for example, by performing a fluorescence image at the same sample location, in which relevant fluorescence markings of the sample are detected and then performed in this fluorescence image via digital image processing of a segmentation. During the subsequent training 130 of the analysis means 60, a transfer information 200 can be determined using the application data and the Ground Truth 112. In other words, training of the analysis means 60, e.g. of a neural network, can be performed on the basis of training information and segmentation masks. The analysis means 60 can automatically learn to recognize the relevant areas of the sample site if necessary. The result of this training can be 130 according to the transfer information 200, in other words as a trained neural net or the like. This may also include a model for estimating the positions and/or contours of relevant areas in the training information 101.

Figure 4:
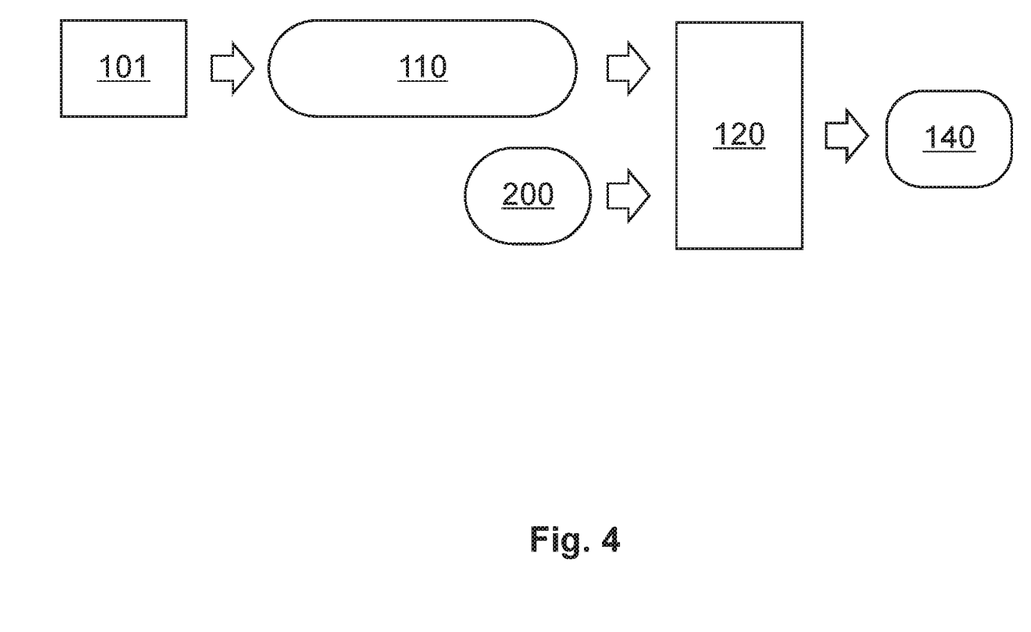

FIG. 4 shows that, on the basis of such machine-applied transfer information, result information, such as an estimate of relevant areas at a sample location, can be determined automatically. In this case, at first a provision, in particular detection 101, of at least two different detection information 110 about the sample 2 can take place, in particular by the detection system 1. Then an evaluation 120 of the detection information 110, in particular by an analysis means 60, can take place on the basis of a machine-learned transfer information 200, in order to determine a result information 140 about the sample 2. It is possible that the transfer information is trained for a different detection parameterization of the detection information, in which the detection information 110 is coded from each other, in particular polarization and/or color coded, at least with regard to one illumination parameter of the detection system. In particular, the transfer information 200 and/or the analysis means 60 may be a transfer information 200 or an analysis means 60 according to the training method described in FIG. 3. By using the coded illumination, the detection information can contain 110 much more information about sample 2, which can then be used by the analysis means 60 (such as a neural network) to estimate the relevant sample areas with very high accuracy. The analysis means 60 can transfer the information from the detection information 110 into a result information 140 independently of a concrete physical model of the optical detection system 1 and is therefore very robust against unknown properties of the optical detection system 1 and deviations from a possibly existing, idealized physical model. It is possible that no knowledge of the optical detection system 1 is required and/or used in order to perform a method in accordance with the invention. It may also be possible that the result information 140, in particular an estimate of the relevant sample areas of sample 2, is obtained from a single image of sample 2. For example, this image has several different detection information 110, i.e. parallel acquired images of the same sample location according to different coding and/or different illumination parameters of the detection system 1. The relevant sample areas are in particular a localization of cells and/or cell nuclei and/or a segmentation of the cells and/or spatial information about objects of sample 2.

Figure 5:
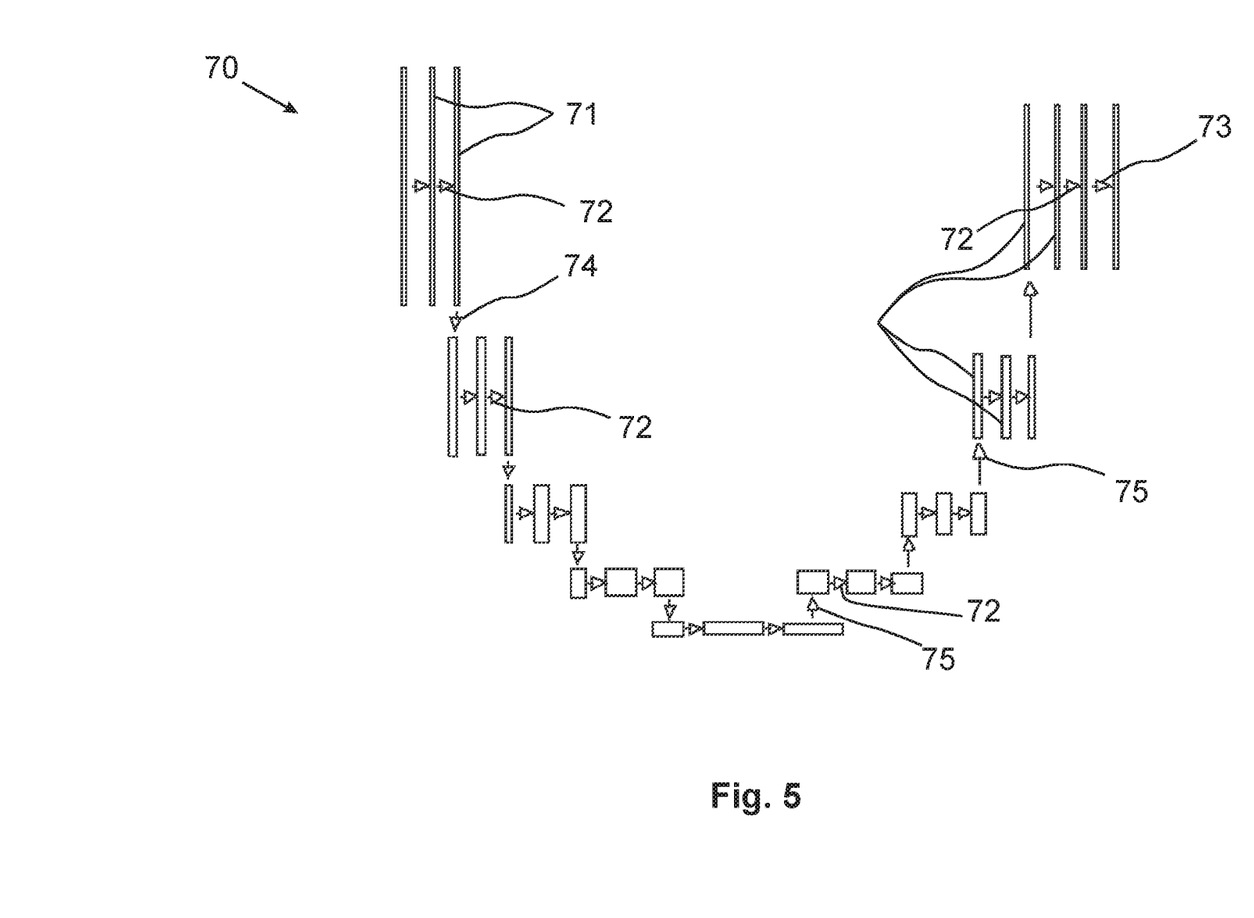

The following explanations describe further examples of execution and further developments of the invention on the basis of FIG. 5, purely optional, and are therefore to be understood without restriction of the disclosure according to the invention.

The analysis means 60, i.e. in particular the neural network, can be configured as a convolutional neural network (CNN), preferably as a fully convolutional network, as in Long, J.; Shelhamer, E.; Darrell, T. (2014). "Fully convolutional networks for semantic segmentation". arXiv: 1411.4038 (Ref. 1), and preferred as a U-Net, as described in Ronneberger, Olaf; Fischer, Philipp; Brox, Thomas (2015). "U-Net: Convolutional Networks for Biomedical Image Segmentation", MICCAI 2015: Medical Image Computing and Computer-Assisted Intervention—MICCAI 2015 pp 234-241, see also arXiv: 1505.04597 (Ref. 2). A possible execution of a network structure and/or the training and/or the application of the network in the invention can thus essentially correspond to the aforementioned literature or the publication of an implementation in this context by the authors (see e.g. "https://lmb.informatik.uni-freiburg.de/people/ronneber/u-net/"). In other words, according to the invention, a known neural network can be used at least substantially unchanged, and thus the production of the training data sets (i.e. the learning information or application data) and/or the training (i.e. learning 130) of the neural network with the training data sets and/or which takes place in a conventional way. With regard to the inventive solution, the present description therefore reveals such steps which deviate from the known training and application steps of machine learning. A possible structure of the network according to the U-Net is shown in FIG. 5.

Further optional structures of the network and possible applications are listed below. For example, the U-Net can be used (in particular for the application of semantic segmentation) (see Sevastopolsky, "Optic Disc and Cup Segmentation Methods for Glaucoma Detection with Modification of U-Net Convolutional Neural Network", https://arxiv.org/abs/1704.00979), for an image classification e.g. the U-Net method described in Szegedy et al, "Rethinking the Inception Architecture for Computer Vision", https://arxiv.org/abs/1512.00567 (see also Gulshan et al., "Development and Validation of a Deep Learning Algorithm for Detection of Diabetic Retinopathy in Retinal Fundus Photographs", JAMA. 2016; 316(22):2402-2410. doi:10.1001/jama.2016.17216, https://jamanetwork.com/journals/jama/article-abstract/2588763 and Esteva et al, "Dermatologist-level classification of skin cancer with deep neural networks", Nature volume 542, pages 115-118, 2 Feb. 2017, http://www.nature.com/nature/journal/v542/n7639/full/nature21056.html) and for an instance segmentation a network structure according to Ronneberger, "U-Net: Convolutional Networks for Biomedical Image Segmentation", https://rd.springer.com/chapter/10.1007/978-3-319-24574-4_28; He et al., "Mask R-CNN", https://arxiv.org/abs/1703.06870; Bai et al., "Deep Watershed Transform for Instance Segmentation", https://arxiv.org/abs/1611.08303.

Weitere Möglichkeiten für die Netzstruktur sind zu finden in Redmon et al., "YOLOv3: An Incremental Improvement", https://arxiv.org/abs/1804.02767 (insbesondere zur Detektion) und (insbesondere für eine Bildregression) Ounkomol et al., "Label-free prediction of three-dimensional fluorescence images from transmitted-light microscopy", https://europepmc.org/articles/pmc6212323; Christiansen et al., "In Silico Labeling: Predicting Fluorescent Labels in Unlabeled Images", https://www.ncbi.nlm.nih.gov/pmc/articles/PMC6309178/sowie Weigert et al., "Content-aware image restoration: pushing the limits of fluorescence microscopy", https://www.nature.com/articles/s41592-018-0216-7. Ferner soil für mögliche Netzstrukturen auf Jing et al., "On the Automatic Generation of Medical Imaging Reports", https://arxiv.org/abs/1711.08195 (für eine Textprädiktion) und Veta et al., "Cutting out the middleman: measuring nuclear area in histopathology slides without segmentation", https://arxiv.org/abs/1606.06127 (für eine Multi-pixel Regression) verwiesen werden.

The following describes an optional network architecture for the neural network with further details. A CNN proved to be particularly suitable. This can be suitable for processing inputs in the form of a matrix, and thus also images represented as a matrix. The respective image can be defined e.g. as an image file by several pixels. For example, the number of pixels in the width of a given image can range from 8 to 2048, preferably 16 to 1024, preferably 32 to 512. The number of pixels in the height can also be within the above ranges, and one or more color channels can be provided. The number of neurons in the Input Layer can correspond to the number of pixels in the image that are passed to the mesh as input. The total number of neurons in the network can also result from the number of pixels used as input for further layers of the network. Specifically, the network can have one or more convolutional layers, which can be followed by a pooling layer (also called aggregation layer). The convolutional layers and the pooling layers can also be arranged alternately repeatedly. After that, a Fully Connected Layer can be optionally connected, but can also be omitted (as in the case of a Fully convolutional network and especially U-Nets). One or more filter kernels (convolutional matrix) can be provided for each convolutional layer, each with a specific matrix size (pixel size), e.g. 2×2 or 3×3.

The activity of each neuron can be calculated by a discrete convolution, e.g. by moving the filter kernel stepwise over the input. The inner product of the filter kernel can be calculated with the currently underlying image section. This application of the filter kernel results in a result matrix (also called "feature channel" or "feature map"). The size of the result matrix can depend on the filter size (kernel size), any padding used and the step size used. The mentioned parameters can also be determined depending on a desired value of the size. The number of result matrices (or characteristic channels) can result from or correspond to the number of filter kernels. The size of the result matrix can also be changed for subsequent layers using the pooling layer (so-called up- or down sampling). With a MaxPooling Layer, for example, the highest value of the result matrix is used and all others are discarded. MaxPooling is very widespread, whereby, for example, only the activity of the most active (hence "Max") neuron is retained for further calculation steps from each 2×2 square of neurons in the convolutional layer. The number of filter kernels can also change. The results of each layer can also be activated by an activation function such as a ReLu (Rectified Linear Unit) function. The ReLu function can be defined as a function where any value less than zero becomes zero and the other values greater than zero are retained.

According to another concrete example, the input can be a detection information such as an input detection, which is configured as a two-dimensional image. If several color channels of the input detection are used, a 3D matrix can be determined from the input detection. A first convolution according to a first convolutional layer can be applied to this matrix. The number of neurons used in this step can be equal to the number of pixels in the matrix.

An optional further development of the network structure 70 can be illustrated as shown in FIG. 5 and described below. For a better overview, the elements described below are only partially marked with reference signs. The net structure 70 may have a contracting path (see left half of net structure 70 in FIG. 5) and an expansive path (see right half of net structure 70 in FIG. 5). Due to the high number of characteristic channels 71 in the expansive path, the U shape of the network structure is 70 (see Ref. 2). The contracting path may correspond to the typical architecture of a CNN. It may initially comprise a repeated application of two 3×3 convolution 72 (convolutions), in particular unpadded and/or with 64 filter kernels and/or each followed by an activation function such as a ReLu (Rectified Linear Unit, e.g. f(x)=max (0, x) with x as input value of the artificial neuron), and then a 2×2 Max Pooling operation 74 in the subsequent step for downsampling. In FIG. 5 the arrows pointing to the right visualize the folds 72, 73 and the arrows pointing down visualize the Max-Pooling 74. Each of the folds 72, 73 up to the last fold 73 can be executed as 3×3 folds 72. The sequence described can then be repeated, whereby the number of feature channels 71 is doubled with subsequent downsampling steps 74. The rectangle (partly marked with 71) visualizes only one feature channel 71 representative for several feature channels. So after each downsampling 74 the feature channels 71 can be doubled (e.g. first of 64 for the first two folds, then 128 for another two folds, then 256 for another two folds, then 512 for another two folds and finally 1024). Afterwards an upsampling can take place in the expansive path (e.g. by an initial 2×2 convolution 75 ("up-convolution") or by an interpolation). The upsampling steps 75 are each indicated by an arrow pointing upwards. Then two 3×3 folds 72 can be made again, each followed by the activation function or the ReLu. This sequence can also be repeated, whereby the number of feature channels can be halved for each 75 upsampling. The network can have a total of 23 convolutional layers. The segmentation (or another trained result, i.e. result information 140) can then result from the last two result matrices. For other applications, it is conceivable that more than two result matrices are planned. FIG. 5 shows a schematic representation of the net structure 70, whereby some operations (e.g. a copy and drop) may be provided, even if they are not explicitly shown.

Furthermore, according to the optional configuration variant, the concrete network architecture is secondary if a relatively high number of training data sets is used. In other words, the network structure can be interchangeable, and does not need to be further adapted if a large number of data sets (i.e. images) are used. Augmentation can also be dispensed with in this case. The training in turn can also be done in the conventional way. For example, a backpropagation is used for this. In concrete terms, the training can take place, for example, as described in Ref. 2. As input, recorded images and associated segmentation cards can be used. An optimization method such as a gradient method ("Stochastic gradient descent") can be used. The inertia term (momentum) can be set high (e.g. 0.99). The energy function can be performed e.g. by a pixelwise soft-max weighting via the feature map. A cross entropy function can be considered as a loss function. Through the training a weighting for the filter kernels can be determined and represented by the transfer information 200.

Another loss function that can optionally be used with the invention is described in the literature Geert Litjens et al. (2017), "A survey on deep learning in medical image analysis", Medical Image Analysis, Volume 42, 2017, pages 60-88, ISSN 1361-8415, https://doi.org/10.1016/j.media.2017.07.005, arXiv:1702.05747 (Ref. 3). The training strategy presented in ref. 3 can also be used for the invention. For example, RGB images can be used as input for the network, so that the respective red, green and blue components of the image are used as input. Augmentation, in particular rotational augmentation, in ref. 3 may be dispensed with if the number of different images used as input is sufficient (e.g. at least 100 or at least 500 or at least 1000). In principle, any artificial augmentation can thus be dispensed with if a larger amount of application data is created as input. An overview of further possible network architectures, which are applicable for other input types of the Ground Truth (e.g. for classification, 3D segmentation or similar), can be found in Ref. 2.

According to a further optional configuration of learning 130, at least one cell sample can be provided after a first training step. This cell sample may contain fluorescence-labelled cell nuclei, in particular those labelled by DAPI (4',6-Diamidin-2-phenylindole). Following a second training step, a variety of images, preferably fluorescence images (using a fluorescence microscope as the detection system) of this cell sample in the DAPI channel, using a white illumination means as the light source, can be obtained with illumination means 10, e.g. in the form of a triple spatially and color coded filter, for the detection 101 of training information and step-by-step detection of the same positions as fluorescence images in the DAPI channel for reference detection 102. In other words, for the detection 101 of training information, in contrast to reference detection 102, the spatial and color coding is used. Thus, the training information is specific for detection information 110, which has different detection parameters. The illumination means 10 can be arranged in the microscope condenser. After a third training step, a segmentation of the fluorescence images of the reference detection 102 taken in the DAPI can be performed to generate a Ground Truth 112. This can be done manually or alternatively automatically using conventional algorithms. In the simplest case, for example, a threshold value for the individual pixels in the images can be used to identify pixels that exceed the threshold value as part of the cell nuclei. In the fourth training step, the analysis means 60 can be trained using the Ground Truth 112 and the training information. The training information can be stored digitally in the form of application data. The analysis means 60 can include a neural network, e.g. according to the aforementioned design. The result of learning 130 can be the transfer information 200, in other words as a trained neural network, in particular as a classifier with the weights for the filter kernels or the like. In this way, the transfer information 200 can be trained for a different detection parameterization of the detection information 110, in which the detection information 110 differs from one another with regard to at least one illumination parameter of the detection system 1, in particular polarization and/or color coding. The analysis means 60 trained in this way can then be used.

The trained analysis means is used, for example, by detecting another sample or sample location based on the method described in the second training step solely with the spatially color-coded (or polarization-coded) illumination in the transmission in order to obtain the corresponding spatially and color-coded (or polarization-coded) illuminated detection information 110. Subsequently, an evaluation 120 (or an inference) can be performed by the semi-skilled analysis means 60 (e.g. model or network) to determine the result information 140, e.g. by estimating the segmentation masks of the cell nuclei. Thus, the result information 140 can be a segmentation of the cell nuclei. The segmentation of the training and/or the application can also be performed as a 2D or 3D segmentation. Another possible application is to perform a classification of images or image areas or a localization (e.g. for counting) of objects or another detection of objects, in particular cells of the sample, instead of segmentation. Furthermore, segmentation can be used to measure a fluorescence signal in the area of a cell compartment, for example.

Another possible application is an estimation of the classification or regression of pixels or objects or sample areas of the sample. For example, a classification of individual image pixels or a classification of entire cells or tissue areas or a regression of individual image pixels, e.g. fluorescence properties or phase information, or a regression of entire cells or tissue areas can be performed. The provision of a cytometric or histological analysis result is also a potential application. Further, e.g. phase information or three-dimensional information about the spatial structure of the sample (e.g. a z-stack for different defocused planes) or at least a fluorescence characteristic of the sample or an extended depth of field of a sample detection (e.g. according to "Extended Focal Image") can be determined. The corresponding classification or another application result (such as a segmentation or detection result) for Ground Truth 112 can be specified for training 130.

An optional way to determine Ground Truth 12 may be to use fluorescence images (from wide field or cofocal images) or phase images from digital holographic techniques, or a Raman spectrum to classify a cell or FLIM images or information that can be determined by reference detection.

The preceding explanation of the embodiment describes the present invention exclusively in the context of examples. Of course, individual features of the embodiments can be freely combined with each other, if technically reasonable, without leaving the scope of the present invention.

REFERENCE CHARACTER LIST

1 Detection system
2 Sample
10 Illumination means, spatially structured color filter
11 1St segment, first color range
12 2nd segment, second color range
13 3rd segment, third color range
20 Imaging optics
30 Light source
40 Detection device, camera
50 Analysis device, computer
51 Processor
52 Data storage
60 Analysis means
70 Network structure
71 Feature channel, feature map
7 2Folding 3×3, ReLu
73 Folding 1×1
74 Downsampling, Max Pool 2×2
75 Up convolution, Up-cony 2×2
101 Detection
102 Reference detection
110 Detection information, color images
111 Reference processing, segmentation
112 Ground Truth
120 Evaluation, Machine learning interference
130 Trainings, Machine learning training
140 Result information
200 Transfer Information, Trained Model

The invention claimed is:

1. A method for microscopic evaluation of a sample, in an optical detection system, where the following steps are performed:
   providing at least two different detection information about the sample by said detection system, and
   performing an evaluation of the detection information, on the basis of machine-learned transfer information, in order to determine result information about the sample, wherein the evaluation is performed by using a neural network, wherein markings of relevant areas of the sample or a three-dimensional structure of the sample are presented to the neural network for training the neural network,
   the transfer information being trained for a different detection parameterization of the detection information, in which the detection information differs from one another in terms of at least one illumination parameter of the detection system
   to provide the following step:
      performing at least one detection of the sample by the optical detection system to obtain the different detection information by varying the illumination parameter, and
   wherein the variation takes place as a change in the spatial illumination structure and at least the illumination color or the spatial illumination structure and the illumination polarization for the different detection information.

2. The method according to claim 1,
   wherein
   the variation takes place as at least the change in the spatial illumination structure or the illumination color or the illumination polarization for the different detection information, an illumination light being at least spatially structured or differently polarized for the purpose of color coding at least two-color or differently polarized for the purpose of polarization coding, and preferably these illumination patterns are specific for the detection information.

3. The method according to claim 1,
   wherein
   the evaluation is performed by an analysis means which is executed as a computer program based at least on machine learning or deep learning or artificial intelligence, preferably as an artificial neural network.

4. The method according to claim 1,
   wherein
   the detection parameterization of the detection information differs from one another in that, during the detection of the detection information, an illumination light, of the detection system has at least different spatial or coded adaptations for different ones of the detection information, preferably by at least spatial structuring or color coding or polarization of the illumination light.

5. The method according to claim 1, wherein
the different detection parameterization of the detection information is specific to the fact that, during the detection, an adaptation of an illumination light is performed by means of an illumination means of the detection system, the illumination means having a coded, preferably differently polarizing or at least two-color, spatial structure in order to provide different illumination patterns for the sample as a function of coding, preferably at least color-dependent or color-coded or polarization-dependent or polarization-coded, different detection information being provided.

6. The method according to claim 1, wherein
the different detection parameterization of the detection information is specific to the fact that the detection of the detection information takes place by simultaneous illumination with at least different illumination colors or polarizations, at least one color-dependent or polarization-dependent, sample detection being performed in order to provide the at least two detection information color-dependently or polarization-dependently.

7. The method according to claim 1, wherein
at least one sample detection is performed by a detection device, of the detection system by means of at least polarization or color filtering in order to provide different detection information at least for different polarizations or illumination colors from the sample detection, preferably the detection device having at least one polarization filter for polarization filtering or a color filter pattern for color filtering.

8. The method according to claim 1, wherein
for providing the following steps are performed to retrieve:
detecting a first image of an area of the sample, preferably with at least a first illumination color or polarization, to obtain a first detection information according to a first detection parameterization, and
detecting at least one second image of the same area of the sample, preferably with at least one second illumination color or polarization different from the first illumination color or polarization, in order to obtain at least one second detection information according to at least one second detection parameterization.

9. The method according to claim 1, wherein
the evaluation is performed by an analysis means which has the transfer information, the following steps being performed for training the analysis means:
performing the detection of an area of the sample by said or a further optical detection system in order to obtain at least two different training information about the sample by varying at least one detection parameter, for the learning information,
determining application data for the analysis means on the basis of the learning information,
performing a reference detection of the same area of the sample by the further optical detection system to determine a ground truth for the analysis means, and
training the analysis means using the application data and the ground truth to determine the transfer information.

10. The method according to claim 1, wherein
the result information or a ground truth for training an analysis means is one of the following information about the sample:
a detection of at least objects or cells of the sample,
an estimate of the classification or regression of pixels or objects or sample areas of the sample,
a cytometric or histological analysis result, phase information, three-dimensional information about the spatial structure of the sample,
at least one fluorescence property of the sample,
an extended depth of field range of a sample detection.

11. An optical detection system comprising
a detection device for detecting at least two different detection information about the sample which differ in code at least with respect to one illumination parameter during the detection, and
an evaluation device which is configured for determining result information about the sample from the detection information on the basis of transfer information trained by a machine, wherein an evaluation of the detection information is performed by using a neural network, wherein markings of relevant areas of the sample or a three-dimensional structure of the sample are presented to the neural network for training the neural network, and
wherein an illumination means is provided which, for at least two different settings of the illumination parameter, has at least a differently polarizing or at least two-color spatial structure.

12. The optical detection system according to claim 11, wherein
the illumination means has at least two adjacently arranged polarization or color filters in order to at least provide polarization or color-dependent different illumination patterns, or in that the illumination means is configured as a condenser insert and is inserted into a condenser unit of the optical detection system for filtering an illumination light, for providing coding, or in that the detection device has at least one camera sensor, preferably an RGB camera sensor, or is configured as a polarization-sensitive camera, in order preferably to perform decoding of the illumination light.

13. The optical detection system according to claim 11, wherein
the optical detection system is at least configured as a microscope system for transmitted light microscopy or is configured to perform a method for microscopic evaluation of a sample, in an optical detection system, where the following steps are performed:
providing at least two different detection information about the sample by said detection system, and
performing an evaluation of the detection information, on the basis of machine-learned transfer information, in order to determine result information about the sample,
the transfer information being trained for a different detection parameterization of the detection information, in which the detection information differs from one another in terms of at least one illumination parameter of the detection system
to provide the following step:

performing at least one detection of the sample by the optical detection system to obtain the different detection information by varying the illumination parameter, wherein the variation takes place as a change in the spatial illumination structure and at least the illumination color or the spatial illumination structure and the illumination polarization for the different detection information.

14. A computer program comprising instructions which, when the computer program is executed by a computer, cause the computer to execute the steps of a method for microscopic evaluation of a sample, in an optical detection system, where the following steps are performed:

providing at least two different detection information about the sample by said detection system, and performing an evaluation of the detection information, on the basis of machine-learned transfer information, in order to determine result information about the sample, wherein the evaluation is performed by using a neural network, wherein markings of relevant areas of the sample or a three-dimensional structure of the sample are presented to the neural network for training the neural network, the transfer information being trained for a different detection parameterization of the detection information, in which the detection information differs from one another in terms of at least one illumination parameter of the detection system to provide the following step:

performing at least one detection of the sample by the optical detection system to obtain the different detection information by varying the illumination parameter, and wherein the variation takes place as a change in the spatial illumination structure and at least the illumination color or the spatial illumination structure and the illumination polarization for the different detection information.

15. A non-transitory computer-readable medium on which the computer program is stored according to a computer program comprising instructions which, when the computer program is executed by a computer, cause the computer to execute the steps of a method for microscopic evaluation of a sample, in an optical detection system, where the following steps are performed:

providing at least two different detection information about the sample by said detection system, and performing an evaluation of the detection information, on the basis of machine-learned transfer information, in order to determine result information about the sample, wherein the evaluation is performed by using a neural network, wherein markings of relevant areas of the sample or a three-dimensional structure of the sample are presented to the neural network for training the neural network, the transfer information being trained for a different detection parameterization of the detection information, in which the detection information differs from one another in terms of at least one illumination parameter of the detection system to provide the following step:

performing at least one detection of the sample by the optical detection system to obtain the different detection information by varying the illumination parameter, and wherein the variation takes place as a change in the spatial illumination structure and at least the illumination color or the spatial illumination structure and the illumination polarization for the different detection information.

* * * * *